United States Patent [19]

Waddill et al.

[11] 4,304,889

[45] Dec. 8, 1981

[54] SOLVENT RESISTANT EPOXY COATINGS

[75] Inventors: Harold G. Waddill; Heinz Schulze, both of Austin, Tex.

[73] Assignee: Texaco Inc., White Plains, N.Y.

[21] Appl. No.: 167,512

[22] Filed: Jul. 11, 1980

[51] Int. Cl.³ .............................................. C08G 59/58
[52] U.S. Cl. .................................. 525/514; 528/111; 528/114; 528/340; 528/341
[58] Field of Search ............... 528/111, 114, 340, 341; 525/514

[56] References Cited

U.S. PATENT DOCUMENTS

| | | | |
|---|---|---|---|
| 4,018,848 | 4/1977 | Khanna | 525/514 X |
| 4,115,361 | 9/1978 | Schulze et al. | 528/111 |
| 4,146,701 | 3/1979 | Waddill et al. | 528/111 X |
| 4,147,857 | 4/1979 | Waddill et al. | 528/111 X |

*Primary Examiner*—Earl A. Nielsen
*Attorney, Agent, or Firm*—Carl G. Ries; Robert A. Kulason; Kenneth R. Priem

[57] ABSTRACT

A solvent resistant epoxy resin composition comprises a vicinal polyepoxide, an aromatic polyamine and a condensation product of a polyoxyalkylenediamine of about 400 molecular weight or below with at least two moles of maleic anhydride.

10 Claims, No Drawings

SOLVENT RESISTANT EPOXY COATINGS

BACKGROUND OF THE INVENTION

1. Field of the Invention

This invention relates to curable epoxy resins having increased resistance to solvents.

2. Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. It is known to use N,N' ethylene bis(maleamic acid) in photohardenable resin compositions. Also, epoxy resins have been hardened with polycarboxylic acids and diaminodiphenylcarboxylic acid. More generally, carboxylic acid from formic to salicylic were suggested as hardening accelerators. References to these prior art curing systems and accelerators are disclosed in the following places:

CA 84, 67870m,
CA 83, 165100j,
U.S. Pat. No. 3,937,751,
German No. 2,100,275,
U.S. Pat. No. 3,963,796, and
Lee & Neville, *Handbook of Epoxy Resins*, McGraw-Hill, 1967, 10–11.

We have disclosed in prior patents curing systems which included succinimides. These succinimides are formed by the condensation of two moles of polyoxyalkylenepolyamines with maleic anhydride, for example. See U.S. Pat. Nos. 4,115,361 and 4,146,701, for example.

From the prior art, it was not apparent that the particular combination of a vicinal polyepoxide and a curing amount of aromatic polyamines with a condensation product of about two moles of maleic anhydride with one mole of a polyoxyalkylene diamine of 400 molecular weight or less would give an epoxy resin having generally good properties and superior solvent resistance.

SUMMARY OF THE INVENTION

According to the broad aspects of the instant invention, epoxy resins with enhanced solvent resistance are made by combining a vicinal polyepoxide with a curing amount of an aromatic polyamine and a condensation product of about one mole of a polyoxyalkylene diamine of the formula:

$$H_2NCH(CH_3)CH_2{\left[OCH_2CH(CH_3)\right]}_xNH_2$$

wherein x is about 5.6 or 2.6 with at least 2 moles of maleic anhydride. In accordance with a preferred embodiment, the polyoxyalkylene diamine has a molecular weight of about 400 (x equals about 5.6).

DESCRIPTION OF THE PREFERRED EMBODIMENTS

Generally the vicinal polyepoxide containing compositions which are amine cured are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolak, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylpropylphenylmethane, 2,2'-dihydroxydiphenylditolylmethane, 4,4'-dihydroxydiphenyltolylmethylmethane and the like. Other polyhydric phenols which may also be coreacted with an epihalohydrin to provide these epoxy polyethers are such compounds as resorcinol, hydroquinone, substituted hydroquinones, e.g., methylhydroquinone, and the like.

Among the polyhydric alcohols which can be coreacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be amine cured and are in accordance with the instant invention includes the epoxy novolak resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolak resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The particular combination of curing agents which impart the superior solvent resistance to the coatings of the instant invention comprise an aromatic polyamine and a condensation product of a polyoxyalkylenediamine with at least two moles of maleic anhydride. The aromatic polyamines useful in our invention may be chosen from that class of compounds known to those skilled in the art wherein an aromatic segment and an amine form a polyamine compound or group of compounds. Illustrative of these compounds are the following: m-phenylenediamine; 4,4'-methylenedianiline; 2,6-diaminopyridine; 4-chloro-o-phenylenediamine; eutectic mixtures of these.

A preferred aromatic polyamine is the condensation product of aniline and formaldehyde which yields a product of the formula:

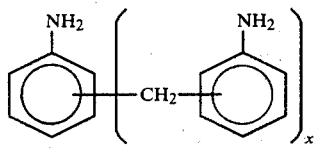

wherein x is about 2.2*.
*JEFFAMINE ®AP-22 from TEXACO CHEMICAL CO.

In combination with this aromatic polyamine, a condensation product of a polyoxyalkylenediamine of the formula

wherein x is about 5.6 or 2.6** with maleic anhydride is required. The condensation product of the polyoxyalkylenediamine requires that an amount of maleic anhydride be used sufficient to satisfy all of the amine sites. It is preferred that at least 2 moles of maleic anhydride be used for each mole of polyoxyalkylenediamine present. In a preferred embodiment of our invention, the polyoxyalkylene diamine of the above formula is used wherein x is about 5.6.
**Where x is 5.6, the product is commercially available as JEFFAMINE ®D-400 from TEXACO CHEMICAL CO. where x is 2.6, the product is commercially available as JEFFAMINE ®D-230 from TEXACO CHEMICAL CO.

Generally, the mixture of epoxy resin, the aromatic polyamine and the condensation product of the polyoxyalkylenediamine and maleic anhydride is allowed to self cure at ambient temperatures of between 0° C. to about 30° C.

It will further be realized that various conveniently employed additives can be admixed with the polyepoxide containing composition of the instant invention prior to final cure. For example, in certain instances it may be desired to add minor amounts of other polyalkyleneamine co-catalysts as herein described, or hardeners along with various other accelerators and curing agent systems well known in the art.

Additionally, conventional pigments, dyes, fillers, flame retarding agents and the like which are compatible, natural or synthetic resins can be added.

Furthermore, known solvents for polyepoxide materials such as toluene, benzene, xylene, dioxane, ethylene glycol monomethylether and the like can be used.

The compositions of the instant invention can be used as impregnants, surface coatings, pottings, encapsulating compositions and laminates.

The following examples illustrate the nature of the instant invention but are not intended to be limitative thereof.

EXAMPLE I

Preparation of Aromatic Amine Condensate
(JEFFAMINE AP-22)

Aniline (325.5g.; 3.5 moles), formaldehyde (30 g., 1.0 moles) and catalyst (Aerocat Silica Alumina; 6.5 g, 2% basis aniline) were added to a reactor which was flushed with nitrogen. Reactants were heated to 200° C. and held at this temperature for three hours. Product was cooled and removed. 4,4' isomer content of product=68.5%.

EXAMPLE II

Preparation of JEFFAMINE ®D400 Maleic
Anhydride Condensate (JEFFAMINE D400 Bis
Hydrogen Maleate)

Reactants were 303 g (3.09 mole) maleic anhyride, 640.5 g (1.5 mole) JEFFAMINE D400 (molecular weight based on primary amine content). Benzene (500 ml.) was used as azeotroping agent. Maleic anhydride was combined with benzene and heated to 56° C. to form clear, colorless solution. D400 was added in 1¾ hours, maintaining a temperature of 50°-60° C. The resulting light brown solution was transferred to a 2 liter flask at 50° C. and stripped first with aspirator, then under high vacuum (90°-95° C., 10-12 mm). Yield=932 g.

High temperature during addition of amine must be avoided. High temperature may lead to amine addition to double bond of maleic. High vacuum stripping is necessary to remove all solvent. At temperatures greater than 94° C., maleic anhydride may be lost and side reactions can occur.

EXAMPLE III

Table I discloses the results of five epoxy resins showing that the epoxy resin of our invention is comparable or superior to a commercial system designed for solvent resistance (A). Epoxy resin D in Table I demonstrates that the use of an aromatic polyamine with only maleic anhydride gives results which are inferior to those wherein the same amount of aromatic polyamine is used in combination with the condensation product of a polyoxyalkylenediamine and maleic anhydride as shown by epoxy resin E of Table I. Epoxy resins B and C demonstrate that an increasing amount of the condensation product of the polyoxyalkylendiamine and maleic anhydride is desirable to obtain superior solvent resistance.

TABLE I

| Ambient Curing with Aromatic Amine Systems | | | | | |
|---|---|---|---|---|---|
| Formultaion: | A | B | C | D | E |
| Epoxy resin (EEW 190) | 100 | 100 | 100 | 100 | 100 |
| Commercial hardener[1] | 46 | — | — | — | — |
| JEFFAMINE ® AP-22 | — | 30 | 30 | 30 | 30 |
| JEFFAMINE ® D-230 Bis(maleamic acid) | — | 12.5 | 5.0 | — | — |
| Maleic anhydride | — | — | — | 12.5 | — |
| JEFFAMINE ® D-400 Bis(maleamic acid) | — | — | — | — | 12.5 |

TABLE I-continued

| Ambient Curing with Aromatic Amine Systems | | | | | |
|---|---|---|---|---|---|
| Formulation: | A | B | C | D | E |
| Benzyl alcohol | — | 12.5 | 20.0 | 12.5 | 12.5 |
| Brookfield viscosity, cps, R.T. | 5600 | 4200 | 2000 | 1900 | 5700 |
| Gel time, mins (200 g mass) | 220 | 52.3 | 144.5 | 13.5 | 200–210 |
| Peak exotherm, °C. | 194.8 | 192.0 | 122.0 | 209.0 | 74.5 |
| Properties of cured ⅛" castings:[2] | | | | | |
| IZOD impact strength, ft-lbs/in | 0.15 | 0.28 | 0.37 | 0.21 | 0.22 |
| Tensile strength, psi | 8400 | 9900 | 9800 | 10400 | 9000 |
| Tensile modulus, psi | 490000 | 507000 | 402000 | 429000 | 503000 |
| Elongation at break, % | 2.0 | 3.2 | 3.5 | 3.9 | 2.1 |
| Flexural strength, psi | 15900 | 15900 | 16400 | 15600 | 15400 |
| Flexural modulus, psi | 530000 | 529000 | 474000 | 441000 | 517000 |
| HDT, °C., 264 psi/66 psi | 52/54 | 50/52.5 | 49/51 | 50/53 | 50/51 |
| Shore D hardness, 0–10 sec. | 86–85 | 90–88 | 88–86 | 86–84 | 89–86 |
| % wt gain, 16 hour xylene boil | —[3] | 8.73 | 4.08 | 4.50 | 11.60 |
| % wt gain, 16 hour 5% acetic acid boil | 1.86 | 3.18 | 1.79 | 2.04 | 2.80 |
| % Retention of flexural strength after 28 day immersion in: | | | | | |
| isopropanol (RT) | 102.8 | 100.0 | 101.8 | 100.1 | 113.3 |
| xylene (RT) | 92.8 | 99.3 | 100.2 | 106.8 | 109.5 |
| 25% acetic acid (RT) | 120.0 | 106.0 | 84.9 | 86.4 | 101.2 |
| 50% sod. hydroxide (RT) | 122.0 | 103.9 | 108.8 | 110.5 | 106.0 |
| 30% sulfuric acid (RT) | 117.2 | 108.0 | 92.2 | 89.5 | 102.1 |
| distilled water (40° C.) | 118.2 | 101.5 | 86.1 | 85.7 | 102.1 |

[1] Accelerated aromatic amine mixture designed to provide resistance to chemical exposure after ambient curing
[2] Cured 7 days at room temperature
[3] Samples destroyed

EXAMPLE IV

Table II demonstrates that one skilled in the art must choose the solvent used to prepare an epoxy coating so that the resulting resistance to solvents is not impaired. Note that in this case furfural alcohol used as a solvent is found to be inferior to benzyl alcohol or phenoxy ethanol.

TABLE II

| JEFFAMINE ® D-400 Bis(Maleamic Acid) as Accelerator of Ambient Curing with JEFFAMINE AP-22: Solvent Effects | | | |
|---|---|---|---|
| Formulation: | A | B | C |
| Epoxy resin (EEW 190) | 100 | 100 | 100 |
| JEFFAMINE AP-22 | 30 | 30 | 30 |
| JEFFAMINE D-400 Bis(Maleamic acid) | 12.5 | 12.5 | 12.5 |
| Furfuryl alcohol | 12.5 | — | — |
| Benzyl alcohol | — | 12.5 | — |
| Phenoxyethanol | — | — | 12.5 |
| Brookfield viscosity, cps, R.T. | 3800 | 5700 | 10400 |
| Properties of cured ⅛" casting:[1] | | | |
| IZOD impact strength, ft-lbs/in | 0.18 | 0.22 | 0.24 |
| Tensile strength, psi | — | 9000 | 7000 |
| Tensile modulus, psi | — | 503000 | 510000 |
| Elongation at break, % | 32 | 2.1 | 1.4 |
| Flexural strength, psi | — | 15400 | 12800 |
| Flexural modulus, psi | — | 517000 | 554000 |
| HDT, °C., 264 psi/66 psi | 48.5/49.5 | 50/51 | 50/51 |
| Shore D hardness, 0–10 sec | 89–87 | 89–86 | 89–87 |
| % wt gain, 16 hour xylene boil | 10.2 | 11.6 | 9.3 |
| % wt gain, 16 hour 5% acetic acid boil | 2.8 | 2.8 | 4.4 |
| % Retention of flexural strength after 28 day immersion in: | | | |
| isopropanol (R.T.) | 107.4 | 113.3 | 110.2 |
| xylene (R.T.) | 100.5 | 109.3 | 109.4 |
| 25% acetic acid (R.T.) | 88.3 | 101.2 | 106.0 |
| 50% sod. hydroxide (R.T.) | 102.2 | 106.0 | 106.7 |
| 30% sulfuric acid (R.T.) | 94.0 | 102.1 | 108.8 |
| distilled water (40° C.) | 82.8 | 102.1 | 107.8 |

[1] Cured 7 days at room temperature

EXAMPLE V

Table III demonstrates the use of a polyoxyalkylenediamine/maleic anhydride condensation product of the invention wherein the diamine is of the lower molecular weight. The solvent effects are shown here as well. It will be noted that cyclopentenyl alcohol is not preferred for use in this particular formulation since it gives a product which is too brittle to be useful as a coating.

TABLE III

| JEFAMINE D-230 Bis(Maleamic Acid) as Accelerator of Ambient Curing with JEFFAMINE AP-22: Solvent Effects | | | |
|---|---|---|---|
| Formulation: | A | B | C |
| Epoxy resin (EEW 190) | 100 | 100 | 100 |
| JEFFAMINE AP-22 | 30 | 30 | 30 |
| JEFFAMINE D-230 Bis(Maleamic Acid) | 12.5 | 12.5 | 12.5 |
| Furfuryl alcohol | 12.5 | — | — |
| Dicyclopentenyl alcohol (Velsicol) | — | 12.5 | — |
| Benzyl alcohol | — | — | 12.5 |
| Brookfield viscosity, cps, R.T. | 11400 | — | 4200 |
| Properties of cured ⅛" castings:[1] | | | |
| IZOD impact strength, ft-lbs/in | 0.13 | —[2] | 0.21 |
| Tensile strength, psi | 10800 | | 9500 |
| Tensile modulus, psi | 549000 | | 479000 |
| Elongation at break, % | 2.4 | | 2.6 |
| Flexural strength, psi | 16700 | | 15300 |
| Flexural modulus, psi | 562000 | | 549000 |
| HDT, °C., 264 psi/66 psi | 51/53 | | 52/54 |
| Shore D hardness, 0–10 sec | 90–88 | | 89–87 |
| % wt gain, 16 hr xylene boil | 7.3 | | 9.3 |
| % wt gain, 16 hr 5% acetic acid boil | 4.1 | | 3.2 |
| % Retention of flexural strength after 28 day immersion in: | | | |
| isopropanol (R.T.) | 108.7 | | 110.5 |
| xylene (R.T.) | 102.8 | | 103.1 |
| 25% acetic acid (R.T.) | 95.4 | | 94.3 |
| 50% sod. hydroxide (R.T.) | 104.3 | | 102.3 |
| 30% sulfuric acid (R.T.) | 107.4 | | 95.8 |
| distilled water (40° C.) | 90.9 | | 100.0 |

[1] Cured 7 days at room temperature
[2] Casting brittle after 7 day cure at room temperature; could not cut into samples.

We claim:

1. A chemically resistant epoxy resin composition comprising a vicinal polyepoxide, an aromatic polyamine and a condensation product of a polyoxyalkylenediamine of about 400 molecular weight or below with at least 2 moles of maleic anhydride.

2. An epoxy resin composition of claim 1 wherein the aromatic polyamine is the condensation product of aniline and formaldehyde.

3. An epoxy resin composition as in claim 1 wherein the polyoxyalkylenediamine has the formula $$H_2NCH(CH_3)CH_2{+}OCH_2CH(CH_3){+}_xNH_2$$

wherein x is about 5.6 or 2.6.

4. An epoxy resin composition as in claim 3 wherein x is about 5.6.

5. An epoxy resin composition comprising a vicinal polyepoxide, an aromatic polyamine which is the condensation product of aniline and formaldehyde and a condensation product of a polyoxyalkylenediamine of the formula $$H_2NCH(CH_3)CH_2{+}OCH_2CH(CH_3){+}_xNH_2$$

wherein x is about 5.6 or 2.6 with maleic anhydride.

6. A method for making a solvent resistant epoxy resin composition which comprises combining a vicinal polyepoxide, an aromatic polyamine and a condensation product of a polyoxyalkylenediamine of about 400 molecular weight or below with at least 2 moles of maleic anhydride and allowing the mixture to cure.

7. A method as in claim 6 wherein the aromatic polyamine is a condensation product of aniline and formaldehyde.

8. A method as in claim 6 wherein the polyoxyalkylenediamine has the formula $$H_2NCH(CH_3)CH_2{+}OCH_2CH(CH_3){+}_xNH_2$$

wherein x is about 5.6 or 2.6.

9. A method as in claim 8 wherein x is about 5.6.

10. A method for making a solvent resistant epoxy resin composition comprising mixing together a vicinal polyepoxide, an aromatic polyamine which is a condensation product of aniline and formaldehyde and a condensation product of a polyoxyalkylenediamine of the formula $$H_2NCH(CH_3)CH_2{+}OCH_2CH(CH_3){+}_xNH_2$$

wherein x is about 5.6 or 2.6 with maleic anhydride and allowing the mixture to cure.

* * * * *